May 25, 1965 W. G. GROTH 3,185,023
OPTICAL INSPECTION APPARATUS
Filed Oct. 26, 1961
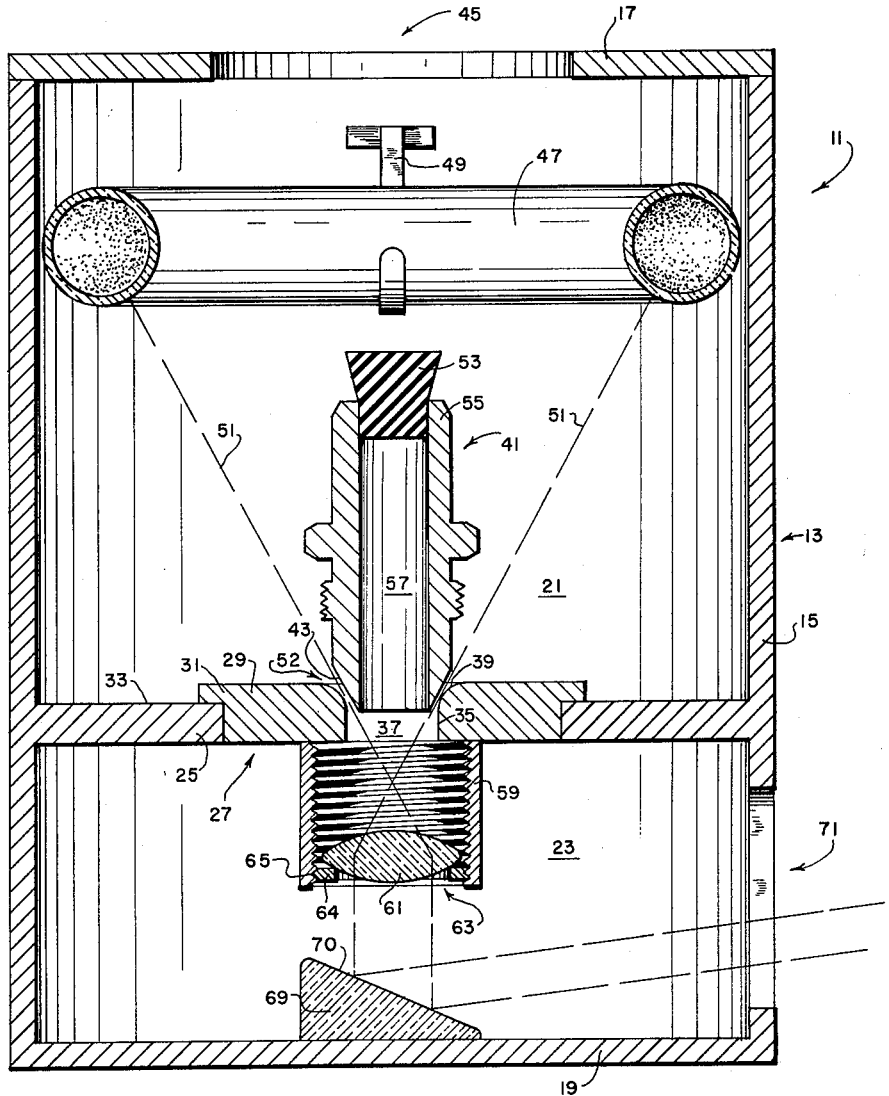
WILLIS G. GROTH
*INVENTOR.*
BY
*ATTORNEYS*

3,185,023
OPTICAL INSPECTION APPARATUS
Willis G. Groth, Huntsville, Ala., assignor to the United
States of America as represented by the Administrator
of the National Aeronautics and Space Administration
Filed Oct. 26, 1961, Ser. No. 148,001
2 Claims. (Cl. 88—14)
(Granted under Title 35, U.S. Code (1952), sec. 266)

The invention described herein may be manufactured and used by or for the Government of the United States of America for governmental purposes without the payment of any royalties thereon or therefor.

This invention relates to an apparatus for detecting minute defects of a surface and more particularly to an inspection apparatus for determining the roundness and regularity of a cone surface.

Generally, a large liquid propellant rocket vehicle contains thousands of demountable tubing connectors of the type in which the flared end of a tube is clamped by a circular collar to a cone surface of a fitting. Reliability of these connectors requires that the fitting have a cone surface which does not deviate from a true conical surface of revolution by more than 0.0005 inch and does not deviate at a rate greater than 0.0001 inch per sixty degrees of arc. Scratches, tool marks, waviness, and chatter marks cannot be tolerated when of a magnitude and location as likely to result in a leak. However, heretofore there was no process or apparatus available for economically testing a cone surface in production quantities. Conventional equipment utilizing a touching contact feeler for determining smoothness and roundness and complex electronic-optical systems employing light comparisons with a standard surface similar to that being tested required skilled handling and long time intervals in accurately determining errors in the order of 0.0001 inch. Other apparatus capable of detecting deviations of a light beam reflected from chatter marks and the like have been found to be unsatisfactory because of the difficulty in assuring the calibrated sensitivity required.

Accordingly, it is an object of the present invention to provide a simplified apparatus for accurately determining minute surface irregularities.

Another object is to provide a simplified apparatus for accurately determining the deviation of a desired configuration for a surface.

Still another object is to provide a simplified apparatus of easily constructed parts for accurately determining deviations from roundness of cone surfaces.

Other and further objects, uses, and advantages of the present invention will become apparent as the description proceeds.

In accordance with the present invention, an inspection apparatus is constructed having a ring gauge with an inner perimetric surface defining a passageway with end openings. The perimetric surface adjacent one of the end openings is so shaped as to be tangent to a select outer perimetric surface desired for a component adapted to be received within the passageway; so that when the select outer perimetric surface of the component is received within the passageway and is placed in a contiguous relationship with the shaped portion of the gauge perimetric surface, any deviation of the select outer perimetric surface of the component will result in incomplete contact with the shaped portion of the perimetric surface of the gauge and form a slit or gap between the two surfaces. The apparatus also including a cooperating light source and optical system for the visual detection of the slit or gap caused by the deviations of the perimetric surface of the component.

This will be more readily understood by the following detailed description when taken together with the accompanying drawing in which:

The single figure shows a partial cross-sectional elevational view of an apparatus embodiment.

Referring now to the drawing, an inspection apparatus 11 is shown having a housing shell 13 defined by an enclosing side wall 15, an upper removable lid 17, and a lower base 19 integral with the side wall 15. The housing shell 13 is divided into an upper chamber 21 and a lower chamber 23 by a partition 25 within the housing shell 13 which is located between the lid 17 and the base 19 and is integrally joined to the inner surface of the side wall 15. The partition 25 has a centrally disposed opening 27 and an interchangeable ring gauge 29 fitted therein which has a projecting ledge 31 resting upon the upper surface 33 of the partition 25 to prevent it from slipping down into the lower chamber 23. The ring gauge 29 has an inner circumferential perimetric surface 35 defining a circular passageway 37 which communicates with the upper and lower chambers 21 and 23. The upper portion of the inner perimetric surface 35 adjacent the opening of the passageway 37 into the upper chamber 21 is shaped to form a toroidal convex edge surface 39.

A component 41 having an outer cone perimetric surface 43 which is of doubtful roundness and regularity is positioned within the upper chamber 21 and orientated whereby its cone surface 43 is received within the opening of the passageway 37 into the upper chamber 21 and is in a contiguous relationship with the toroidal convex surface 39 of the ring gauge 29. The actual contact area between the male cone surface 43 and the toroidal convex surface 39 defines only a circular or segmented circular line. However, while only a small line-like area of the outer cone surface 43 is being tested for a given diameter of the passageway 37, it has been found to be a satisfactory indication of the roundness and regularity of the total outer cone surface 43. For most applications, therefore, the diameter of the passageway 37 should be selected so that the line of contact between the outer cone surface 43 and toroidal convex surface 35 is located approximately midway of the length of the outer cone surface 43.

It is apparent that for any diameter of the passageway 37 a variety of different outer cone surfaces 43 may be tested because of the toroidal convex surface 39 which allows the outer cone surface 43 to remain tangent thereto anywhere along its length. The normal position desired for the component 41 within the upper chamber 21 is where the axes of revolution for the outer cone surface 43 and for the toroidal convex surface 39 approximately coincide and this may usually be successfully accomplished manually by an operator reaching through an opening 45 within the upper lid 17.

Within the upper portion of the upper chamber 21 adjacent the lid 17 is an annular fluorescent lamp 47 which is secured to the side wall 15 by a conventional bracket 49. The fluorescent lamp 47 is located so as to emit light 51 directly toward the contiguous surfaces 39 and 43 of the ring gauge 29 and the component 41 without interference. Thus, it can be seen that any deviation along the line of contact of the outer cone surface 41 of the component from a true circle or from a smooth surface will result in an incomplete contact with the corresponding line of contact of the toroidal convex surface 39 of the ring gauge 29 and the resulting slit or gap 52 will allow light 51 from the fluorescent lamp 47 to pass on through into the lower chamber 23 at a diverging angle corresponding approximately to the slope of the outer cone surface 43. If the component 41 is a tubular fitting as shown in the drawing, a resilient stopper 53 is inserted within its upper end 55 to prevent light from entering into the lower chamber 23 through the fitting's passageway 57. It should be noted that the intensity of the light 51 directed toward the contiguous surface 29 and 43 of the ring gauge 27 and the component 41 is aided by any reflected light from the removable lid 17.

Within the lower chamber 23 and suspended by a tubular support 59 from the lower side of the ring gauge 29 so as to be directly beneath the ring gauge's passageway 37 is an asymmetrical double convex lens 61 for collimating the light 51 passing between the contiguous surfaces 39 and 43 of the ring gauge 29 and the component 41 into parallel rays of light 51 so that they form a visual image in the form of a segmented ring of light or a point of light. The lens 61 is supported within the inner passageway 63 of the tubular support 59 by a ring 64 which is adapted to be adjusted along the inner surface of the tubular support by cooperating threads 65 of the tubular support 59 and ring 64. Thus, the lens 61 can be adjusted up and down within the tubular support 59 to compensate for changes in the angle the light 51 enters the lower chamber 23. It is to be noted that the lens 61 does not distort adjacent rays of light 51 as would be expected in using a single double convex lens because any light passing through into the lower chamber 23 enters the lens 61 at the same distance from its center.

A mirror 69 is also within the lower chamber 23 and is supported upon the base 19 for receiving the light 51 from the lens 61 upon its surface 70 and reflecting it out through an opening 71 within the side wall 15 whereby it may be easily observed.

The inspection apparatus 11 is extremely accurate and easily detects chatter marks and irregularities of a cone surface down to and including 0.0001 inch. By experimentation with known deviations of a cone surface, an operator of the inspection apparatus 11 will quickly be able to pass on the acceptability of a cone surface as well as be able to give an accurate estimate of the amount of any deviation of the cone surface and the problems incurred thereby by merely observing the characteristics of the light collimated by the lens 61. Of course, if the cone surface 43 of the component 41 is perfect, no light will be observed.

While it is apparent that the edge surface 39 of the ring gauge 29 could have also been shaped into a surface complementary to a cone surface desired for the component 41, it would not have the advantage of being able to test a variety of components having a slight variation in their desired cone angle as the toroidal convex edge surface 39.

Obviously, many modifications and variations of the present invention are possible in the light of the above teachings. It is, therefore, to be understood that within the scope of the appended claims the invention may be practiced other than as specifically described.

What is claimed is:
1. An inspection apparatus for a component having a cone surface, comprising:
    (a) a housing shell having an upper and a lower chamber;
    (b) a gauge supported by said housing shell and having an inner circumferential surface defining a circular passageway which communicates said upper and lower chambers;
    (c) said inner circumferential surface adjacent said upper chamber being shaped into a toroidal convex surface;
    (d) a light source within said upper chamber and secured to said housing shell;
    (e) a lens within said lower chamber;
    (f) means for suspending said lens directly beneath said annular passageway; and
    (g) a reflecting device within said lower chamber and secured to said housing shell
    (h) whereby, light from said light source is restrained from entering said lower chamber when said component has its cone surface supported by the toroidal convex surface of said gage for inspection purposes except where there are irregularities in said cone surface, the amount of light entering said lower chamber between said cone surface and said gage being indicative of the degree of irregularity of said cone surface and said light entering said lower chamber is collimated and reflected for ease in detection.
2. An inspection apparatus for detecting deviations of a cone surface of a component, comprising:
    (a) a housing having an inner chamber;
    (b) a gauge supported by said housing and dividing said inner chamber into an upper portion and a lower portion;
    (c) said gauge having an inner circumferential surface defining a circular passageway which communicates said upper and lower chambers;
    (d) said inner circumferential surface adjacent said upper portion of said chamber being shaped into a toroidal convex surface;
    (e) said passageway serving to receive the component to be tested so that the component's cone surface is in a contiguous relationship with the toroidal convex surface and any deviation of the component's cone surface will result in incomplete contact with the toroidal surface and form a slit or gap;
    (f) a light source in the upper portion of said chamber; and
    (g) optical means for detecting light passing through said slit or gap.

References Cited by the Examiner
UNITED STATES PATENTS

| | | | |
|---|---|---|---|
| 2,433,558 | 12/57 | Hurley | 88—14 |
| 2,441,343 | 5/48 | Becker | 88—14 |
| 2,466,161 | 4/49 | Doll. | |
| 2,490,376 | 12/49 | Rupley | 33—174 |
| 2,574,119 | 11/51 | Mottu | 88—14 X |
| 2,958,255 | 11/60 | Dietrich | 88—14 |

JEWELL H. PEDERSEN, *Primary Examiner.*